United States Patent
Campbell

(10) Patent No.: US 11,915,573 B1
(45) Date of Patent: Feb. 27, 2024

(54) LOCATOR DEVICE FOR EYEWEAR

(71) Applicant: Yvongular Campbell, Arcadia, FL (US)

(72) Inventor: Yvongular Campbell, Arcadia, FL (US)

(*) Notice: Subject to any disclaimer, the term of this patent is extended or adjusted under 35 U.S.C. 154(b) by 157 days.

(21) Appl. No.: 17/675,119

(22) Filed: Feb. 18, 2022

(51) Int. Cl.
G08B 21/24 (2006.01)
G02C 11/00 (2006.01)

(52) U.S. Cl.
CPC .......... *G08B 21/24* (2013.01); *G02C 11/10* (2013.01)

(58) Field of Classification Search
None
See application file for complete search history.

(56) References Cited

U.S. PATENT DOCUMENTS

| | | | |
|---|---|---|---|
| 5,939,981 A * | 8/1999 | Renney | G08B 21/0227 340/407.1 |
| 6,870,483 B1 | 3/2005 | Davis | |
| 7,800,492 B2 | 9/2010 | Olson | |
| 10,754,177 B1 * | 8/2020 | Levich | A41G 7/02 |
| 2007/0109126 A1 * | 5/2007 | House | G08B 21/24 340/572.1 |
| 2008/0136642 A1 * | 6/2008 | Wise | G08B 13/1427 340/572.1 |
| 2012/0229280 A1 * | 9/2012 | Westerlund | G08B 13/1427 340/572.1 |
| 2021/0141246 A1 * | 5/2021 | Hilton | G02C 9/04 |

* cited by examiner

*Primary Examiner* — Carlos Garcia
(74) *Attorney, Agent, or Firm* — Sanchelima & Associates, P.A.; Christian Sanchelima; Jesus Sanchelima

(57) ABSTRACT

A locator device for eyewear including a locator assembly and an electrical assembly. The locator assembly includes a locator housing which has a dinosaur shape. Said housing is volumetrically suitable to be attached to a pair of eyewear and to enclose the electrical assembly. The electrical assembly includes a light system, a speaker, a transceiver unit, and a microcontroller. The locator device is capable of being wirelessly connected to an electronic device to permit a user to easily find the eyewear wherein the locator is attached. The locator device is capable of convey audible and visual notifications. The microcontroller is capable of sending the location of the locator device wirelessly to an electronic mobile device.

6 Claims, 3 Drawing Sheets

LOCATOR DEVICE FOR EYEWEAR

BACKGROUND OF THE INVENTION

1. Field of the Invention

The present invention relates to a locator device for eyewear and, more particularly, to a locator device for eyewear that has a dinosaur shape and includes electrical elements that convey visual and audible alarms for a user to easily find the device.

2. Description of the Related Art

Several designs for locating devices have been designed in the past. None of them, however, include a locator device for eyewear that has a dinosaur shape housing volumetrically suitable to be attached to a pair of eyewear, wherein said locator includes wireless technology to locate your eyewear using an electronic device such as a smartphone.

Applicant believes that a related reference corresponds to U.S. Pat. No. 7,800,492 issued for a locator device that is used to find small objects such as keys or glasses. Applicant believes that another related reference corresponds to U.S. Pat. No. 6,870,483 issued for a locator apparatus that can be incorporated into objects such as eyeglasses. None of these references, however, teach of a locator device for eyewear that is comprised of a dinosaur shaped clip on locator device that contains lights, a speaker, and a charging port, that can be clipped to a pair of eyewear and wirelessly connected to an electronic mobile device which can be used to actuate an audible and visual notification in the locator device.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a locator device having a dinosaur shape that is child friendly.

It is another object of this invention to provide a locator device that allows a user to find eyewear easier than ever.

It is still another object of the present invention to provide a locator device that incorporates wireless technology that connects to an electronic device to locate your eyewear at a touch of a button.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
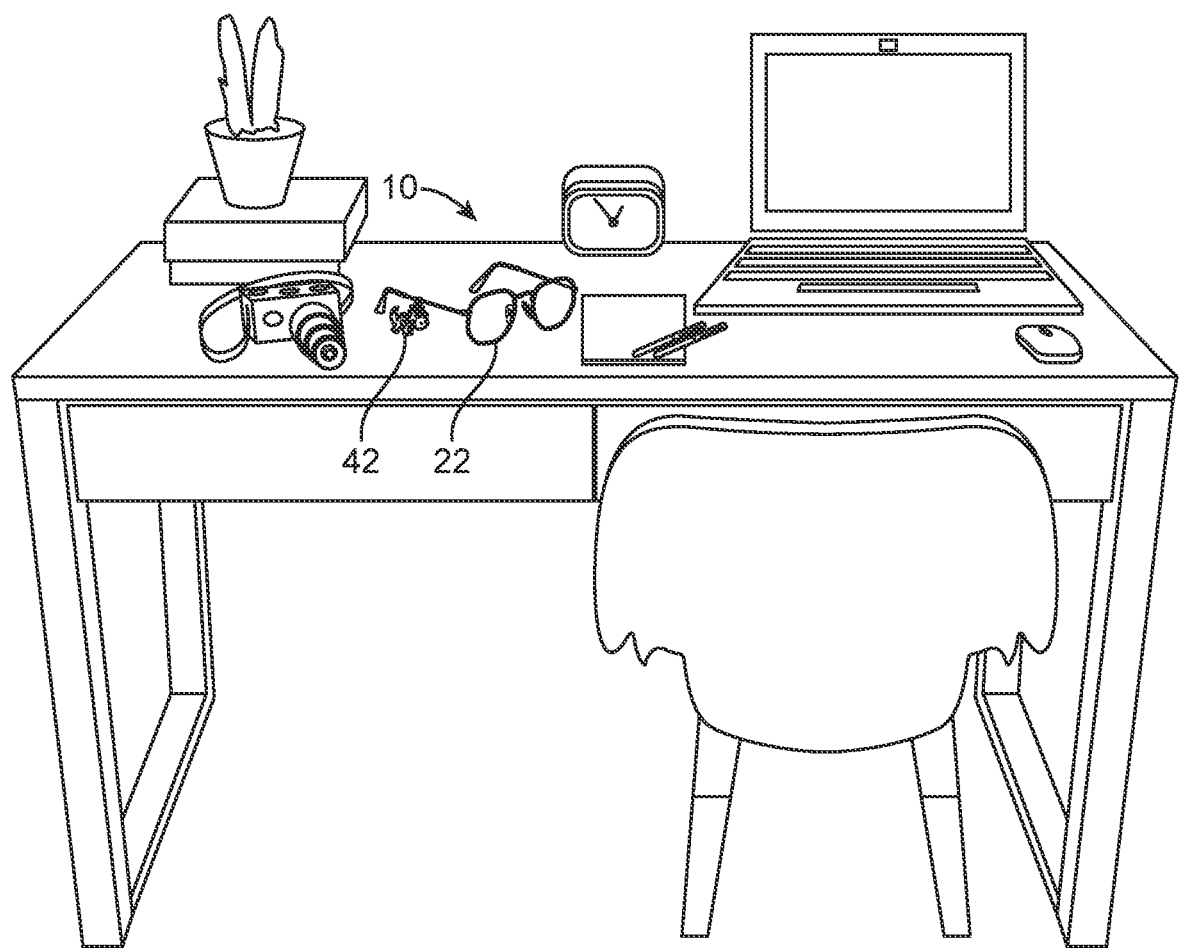
FIG. 1 represents an operational view of the present invention 10 used to locate a pair of eyewear.

Referring now to the drawings, where the present invention is generally referred to with numeral 10, it can be observed that it basically includes an eyewear assembly 20, a locator assembly 40, an electrical assembly 60, and a fastening assembly 80. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The eyewear assembly 20 includes an eyewear 22. The eyewear 22 may be a full-frame eyewear, a semi-rimless eyewear, rimless eyewear, spectacles, contact lenses, or the like. In a preferred embodiment the eyewear 22 may include a frame. The frame may be made of acrylic, polycarbonate, polyethylene, polypropylene, polyethylene terephthalate, polyvinyl chloride, acrylonitrile-butadiene-styrene, wood, metal, fibers, ceramics, or any variation thereof. Said frame may have legs. Said legs may be configured to rest upon a user's ears. Frame may also include a front portion wherein lenses may be mounted. The eyewear 22 may have a predetermined shape, color, and size.

Figure 3:
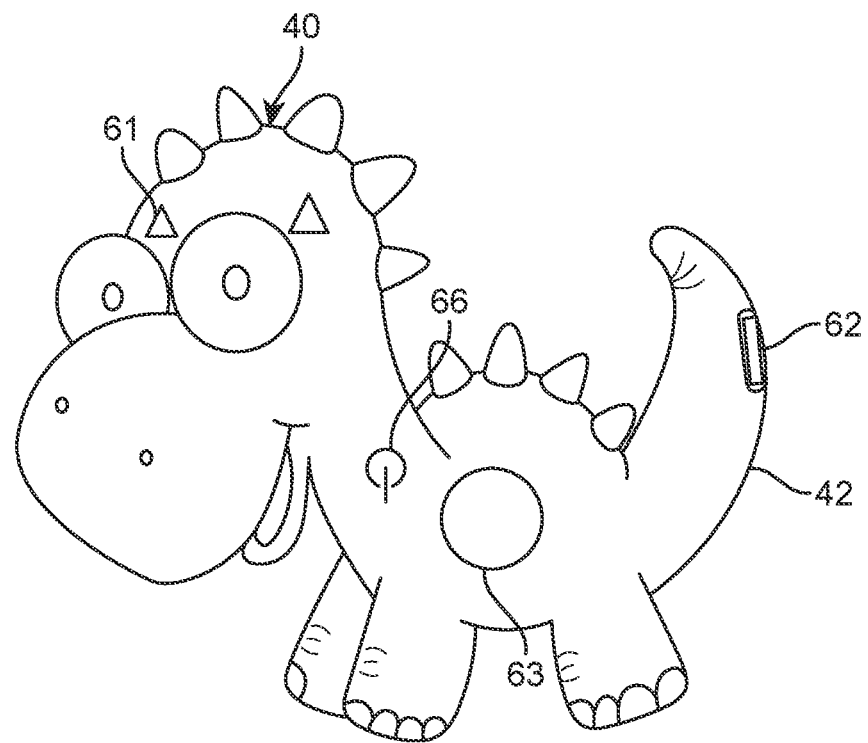
FIG. 3 illustrates an isometric view of the locator housing 42 having a dinosaur shape. Some elements of the electrical assembly are shown such as the light system 61, the power button 66, the charging port 62, and the speaker 63.
Figure 4:
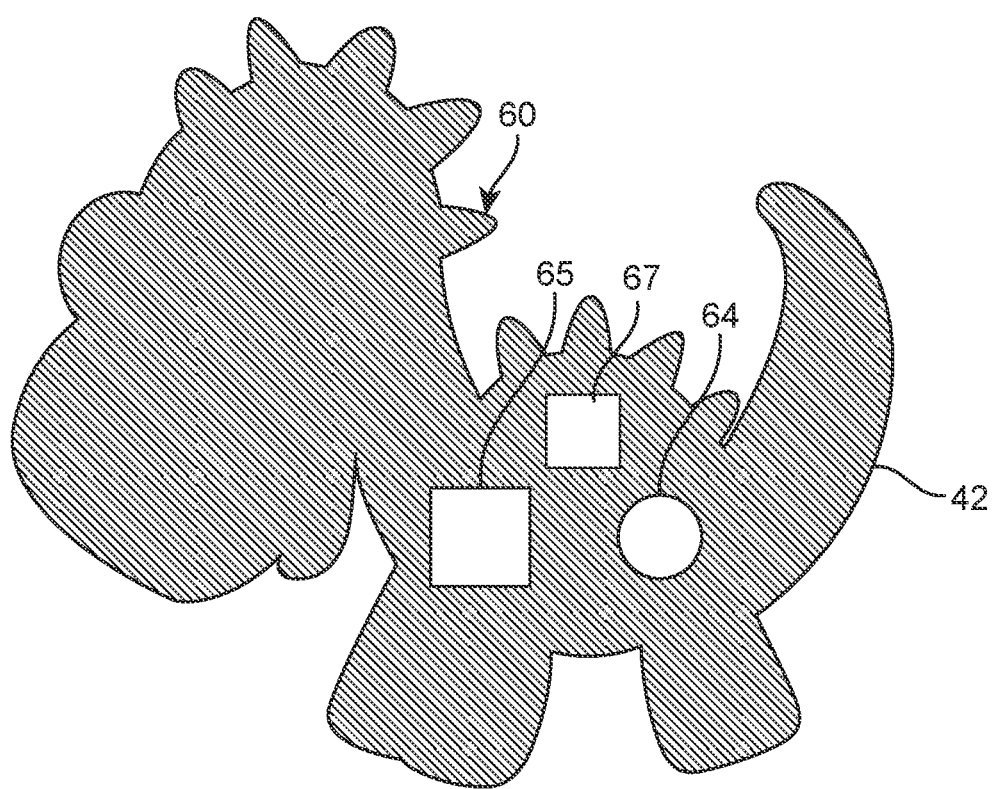
FIG. 4 is a representation of a cross sectional view of the locator housing 42 showing elements of the electrical assembly 60 such as the battery 64, the transceiver unit 65, and the microcontroller 67.

The locator assembly 40 includes a locator housing 42. The locator housing 42 may be made of a resistant, sturdy, durable material. Locator housing 42 may be volumetrically suitable to enclose the electrical assembly. The locator housing 42 may also be volumetrically suitable to be attached to the eyewear 22. Locator housing 42 may be made of acrylic, polycarbonate, polyethylene, polypropylene, polyethylene terephthalate, polyvinyl chloride, acrylonitrile-butadiene-styrene, steel, stainless steel, metal alloys, fibers, ceramics, wood, metal, cloth, foam, or any variation thereof. In a suitable embodiment said locator housing 42 may have a dinosaur shape as shown in FIG. 3. The dinosaur shape may have a dinosaur head, dinosaur legs, dinosaur legs, dinosaur tail, and any other features present in the structure of a dinosaur. However, in other embodiments said locator housing 42 may have an animal shape, a plant shape, a machine shape, a geometrical shape, or any variation thereof.

The electrical assembly 60 includes light system 61, a charging port 62, a speaker 63, a battery 64, a transceiver unit 65, a power button 66, and a microcontroller 67. The light system 61 may be mounted on the head of said locator housing 42 having a dinosaur shape, nonetheless in other embodiments said light system may be located wheresoever on the locator housing. The light system 61 may comprise incandescent lamps, compact fluorescent lamps, light emitting diodes, or the like. In a suitable embodiment LED lights may compound the light system 61. The light system 61 may be used for a user to visually locate the locator housing 42. The speaker 63 may be located on the body of said locator housing 42 having a dinosaur shape. Speaker 63 may be enclosed by said display locator housing 42. In a suitable embodiment speaker 63 is a piezo siren. However, in other embodiments the speaker 63 may be a piezo audio transducer, a mini speaker, a thin speaker, a PCB-mount speaker, a piezo audio indicator, or any variation thereof. Speaker 63 conveys an auditory alarm for a user to locate the locator housing 42. A transceiver unit 65 may allow wireless connection between the locator device for eyewear 10 and an electronic device such as a smartphone, a laptop, a tablet, or the like. Transceiver unit 65 may receive and send a signal having format of an electromagnetic radiation. Transceiver unit 65 may use wireless technology such as ultrasonic technology, infrared technology, RF technology, Wi-Fi™ technology, Bluetooth™ technology, or any variation thereof. The microcontroller 67 may be embedded within said locator housing 42. Microcontroller 67 may be connected to said light system 61, to said speaker 63, to said transceiver unit wherein said connection can be wires. Said microcontroller 67 may be configured to connect with an electronic device by means of the transceiver unit 65 to wirelessly send the location of the locator housing 42 to said electronic device. Microcontroller 67 may have a GPS unit to send the location of the locator device 10. The microcontroller 67 may be configured to activate the light system 61 and the speaker 63 to convey visual and auditory alarms to indicate a user where the device may be. The battery 64 may be connected to the microcontroller 67, the light system 61, the speaker 63, the transceiver unit 65 to supply electric energy to the aforementioned elements. Battery 64 may be rechargeable, however in other embodiments said battery may be a single-use battery. The power button 66 may be located on the body of the locator housing 42 having a dinosaur shape. However, in other embodiments the power button 66 may be placed wheresoever on the locator housing 42. Power button 66 may be a push button, a selector button, a toggle switch, a tactile button, or the like. The power button 66 may turn the device 10 on and off. The charging port 62 may be located on the tail of the locator housing 42 having a dinosaur shape, however said charging port 62 may be located wheresoever on the locator housing 42. The charging port 62 may be an USB-A type port, an USB-C type port, a lightning type port, a micro-USB type port or any variation thereof. The charging port 62 may be connected to the battery 64. The charging port 62 may permit to recharge the battery 64.

Figure 2:
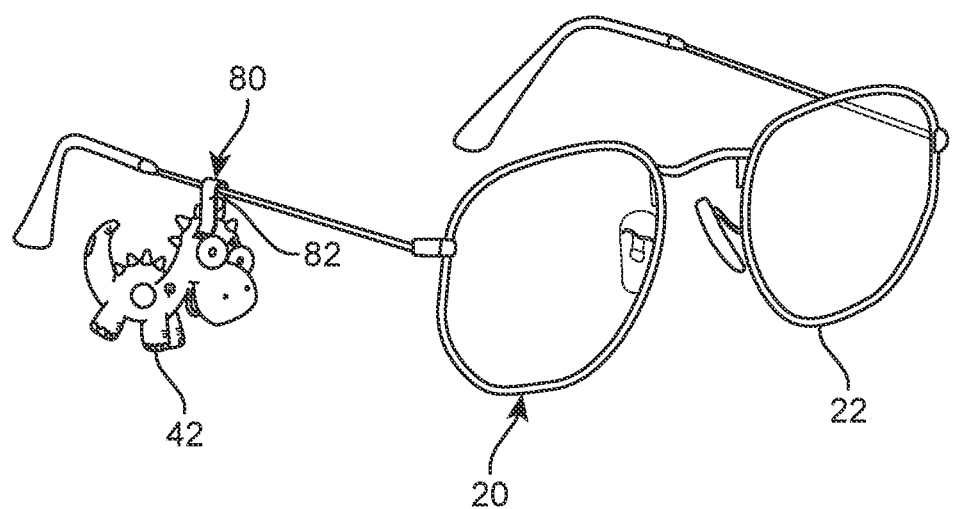
FIG. 2 shows an isometric view of the locator housing 42 attached to an eyewear 22 by means of a fastener 82.

The fastening assembly 80 may include a fastener 82. The fastener 82 may be a clip fastener, a hook and loop fastener, brooches, snap hooks, safety pins, or any variation thereof. Fastener 82 may be mounted onto said locator housing 42 as depicted in FIG. 2. The fastener 82 may allow a user to attach the locator housing 42 to the eyewear 22.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A locator device for eyewear, comprising:
 a) an eyewear assembly including an eyewear;
 b) a locator assembly including a locator housing, said locator housing has a dinosaur shape, the locator housing is attached to said eyewear by means of a fastener, the fastener is located at the top end of the housing assembly; and
 c) an electrical assembly including a light system, a speaker, a transceiver unit, said transceiver unit is configured to be connected to an electronic mobile device which is capable of being used to actuate an audible and visual notification, said electrical assembly further including a power button a rechargeable battery and a microcontroller, wherein said transceiver unit, said battery and said microcontroller are embedded within a cross-section of the locator housing said power button is located on the locator housing having the dinosaur shape, said microcontroller having a GPS unit to transmit the location of the locator device to said electronic mobile device.

2. The locator device of claim 1, wherein said transceiver uses wireless technology.

3. The locator device of claim 1, wherein said electrical assembly further includes a charging port.

4. The locator device of claim 1, wherein said transceiver unit receives and transmits instructions to said microcontroller for the microcontroller to execute predetermined tasks.

5. The locator device of claim 3, wherein said charging port is connected to said battery to externally recharge the battery.

6. A locator device for eyewear, consisting of:
 a) an eyewear assembly including an eyewear;
 b) a locator assembly including a locator housing, said locator housing has a dinosaur shape;
 c) an electrical assembly including a light system, a speaker, a transceiver unit, a microcontroller, a battery, and a charging port, said transceiver unit is configured to be connected to an electronic mobile device which is capable of being used to actuate an audible and visual notification, said transceiver uses wireless technology, said transceiver unit receives and transmits instructions to said microcontroller for the microcontroller to execute predetermined tasks, said battery is rechargeable, said charging port is connected to said battery to externally recharge the battery wherein said transceiver unit, said battery and said microcontroller are embedded within a cross-section of the locator housing, said microcontroller having a GPS unit to transmit the location of the locator device to said electronic mobile device; and
 d) a fastening assembly including a fastener, said fastener is mounted onto said locator housing, said fastener permits to attach the locator housing to the eyewear.

* * * * *